Patented Oct. 18, 1949

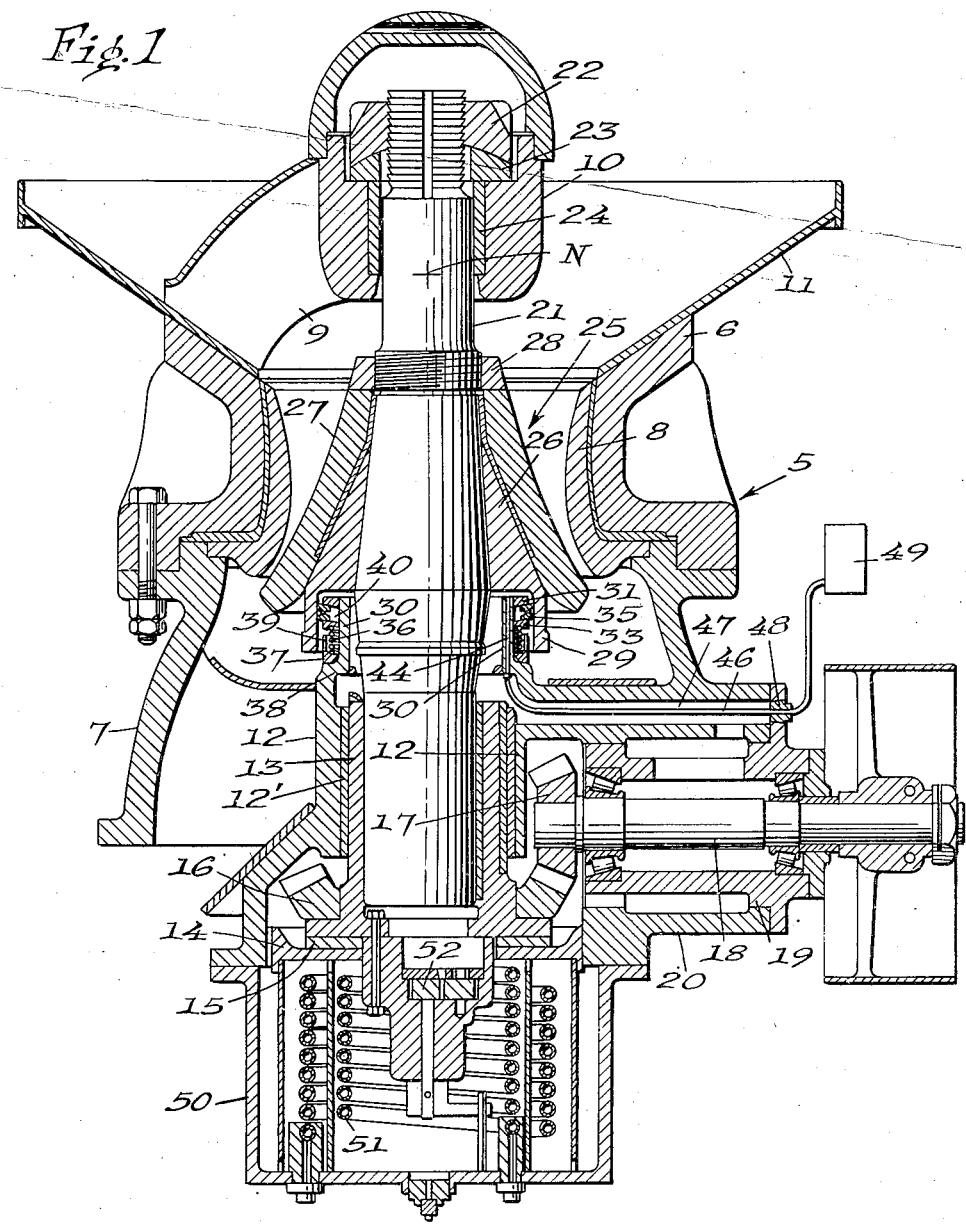

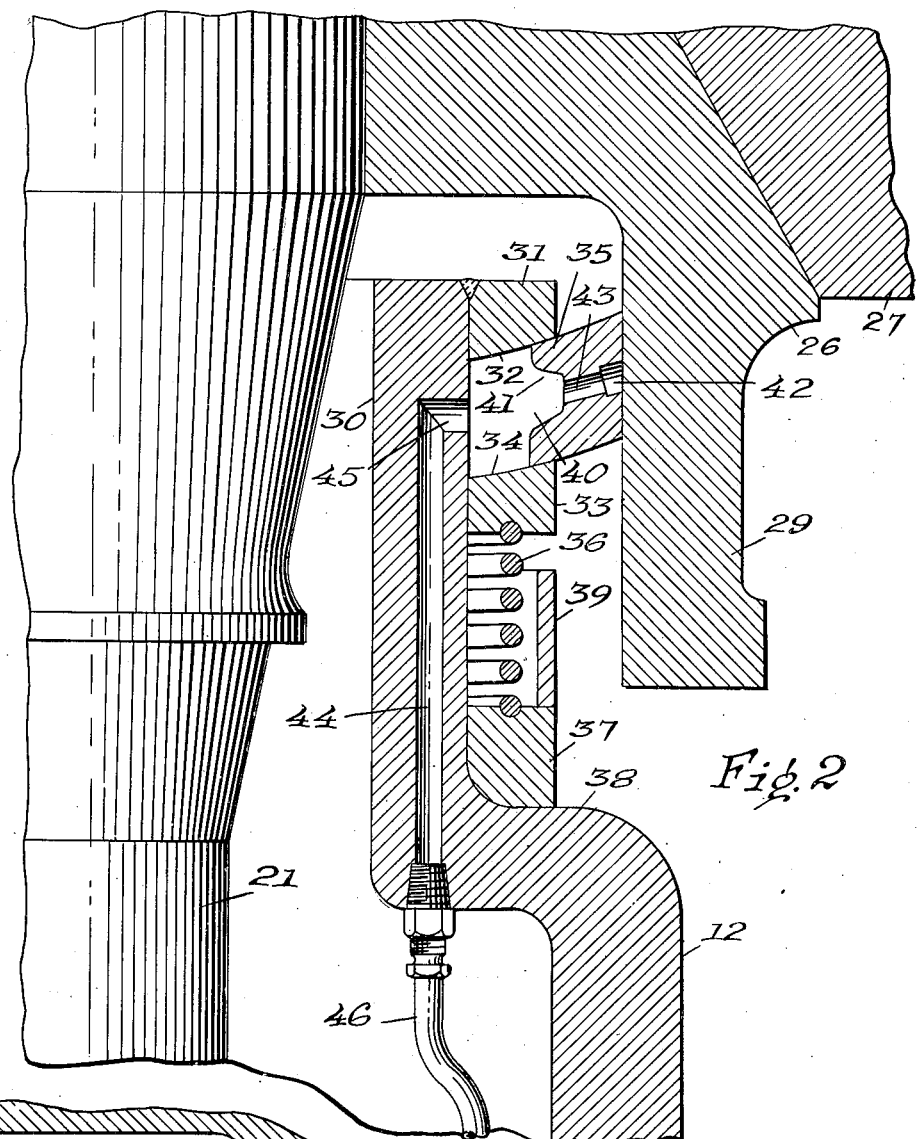

2,484,971

UNITED STATES PATENT OFFICE 2,484,971

GYRATORY CRUSHER WITH LUBRICATED DUST SEAL

Samuel W. Traylor, Jr., Allentown, Pa.

Application June 10, 1946, Serial No. 675,600

9 Claims. (Cl. 241—216)

In the design of gyratory crushers, a major problem has been the effective exclusion of dust from the lower bearing elements. In the patent to Haas and Bernhard, No. 1,716,342, June 4, 1929, a sealing ring is provided between the lower portion of the crushing head and a collar extending upwardly from the hub into which the lower end of the gyratory shaft extends. In practice, this seal has been found very efficient when new but due to lack of lubrication, the seal wears rapidly and, when worn, it allows dust to enter the bearing and contaminate the oil supplied for the lubrication of the bearing. The principal object of the present invention is the provision of a ring seal with means for the supply of lubricant to all surfaces thereof which are subject to relative movement, so that the effectiveness of the seal is maintained substantially indefinitely. The invention is shown in illustrative embodiment in the accompanying drawings in which Figure 1 is an axial section of a gyratory crusher, Figure 2 shows on an enlarged scale parts which appear in the section of Figure 1, and Figure 3 is a partial axial section of a crusher showing a modification of the sealing ring arrangement.

Referring to Figures 1 and 2, the illustrated crusher comprises a frame 5 including top and bottom shells 6 and 7 between which is clamped a concave 8. The upper shell 6 includes a spider, of which one of the arms appears at 9, supporting a bearing 10. Supported on the upper end of the shell 6 is a hopper 11.

The lower shell includes a hub 12 aligned with the upper bearing and serving as a bearing, through a bushing 12', for an eccentric 13 whose thrust is taken by a bottom plate 14 through a wear ring 15. Fixed to the lower end of the eccentric is a bevel gear 16 engaged by a bevel gear 17 fixed on a drive shaft 18 journalled in a barrel 19 inserted in a sleeve formation 20 of the lower shell.

Journalled in the eccentric is the lower end of an upright shaft 21 whose upper threaded end is engaged by a suspension nut 22 having a spherical lower surface engaged with the mating surface of a wearing ring 23 in turn supported by the bearing 10 through a suspension bushing 24, the spherical surfaces being struck from the neutral point N of the shaft. The shaft is vertically adjustable through manipulation of the nut 22.

Fixed on shaft 21 within the concave 8 is a crushing head 25 which, as here shown, includes a center or core 26 and a mantle 27, these parts being wedged on a conical portion of the shaft by a ring nut 28. The core includes a depending annular flange 29 whose interior is cylindrical on the shaft axis. Extending upwardly from the hub 12 into and spaced inwardly of flange 29 is a collar 30 whose exterior surface is cylindrical on the machine axis. As here shown, the collar is integral with the hub although it could be a separate part as indicated in the patent above mentioned.

Secured to the bottom of the lower shell 7 is an oil sump 50 with a cooling coil 51. A pump 52 pumps oil upwardly about the end of shaft 21 to overflow at the upper end of the eccentric and return to the sump. The system is closed except at the upper end of hub 12 where clearance must be provided for the gyratory movement of the shaft. Closure is completed at this point by flange 29, collar 30 and the lapped ring structure which will now be described.

Fixed to the upper end of the collar, as by welding or otherwise, is a ring 31 having a spherical lower face 32 struck from the neutral point N of shaft 21. Slidable on the collar with a close sliding fit below ring 31 is a ring 33 having a top spherical surface 34 struck from the center N, the rings constituting the side walls of an outwardly facing, peripheral or circumferential channel whose inner wall, as here shown, is constituted by the intervening peripheral surface of the collar. Engaged in circumferential lapping or interleaved relation in the channel and between the rings is a sealing ring 35 having spherical top and bottom faces slidingly mating with the faces 32 and 34. Ring 33 is urged upwardly by a compression spring 36 which surrounds the collar and seats at its lower end against a ring 37 supported on a shoulder 38 which exists between hub 12 and collar 30, the lower portion of the spring being protected by an outwardly spaced annular guard 39 which is fixed on ring 37, the guard projecting well within the flange 29. The sealing ring 35 is thus yieldingly clamped between rings 31 and 33 and wear is automatically taken up by the spring.

The inner surface of ring 35 is spaced from the collar 30 so that a chamber 40 is provided, which chamber may be enlarged by providing an outwardly tapering annular groove 41 on the inside of ring 35. The outer face of ring 35 is cylindrical and is in close sliding contact with the inner cylindrical face of flange 29. The outer face of the ring is provided with a circumferential groove 42 which is in communication with the chamber 40 through a duct or ducts as at 43.

Formed in the collar 30 is an axially and upwardly extending blind bore 44 whose upper end is in communication with chamber 40 through an opening or port 45. Reference numeral 46 designates a tube coupled to the lower end of passage 44 and extending through a passage 47 provided in the lower shell and constituting a return passage in the main lubricating system, and through a packed opening in a closure plug 48 to a source of lubricant 49. As here shown, the source is a tank located above the level of the chamber 40 to provide for gravity flow to the latter, although if desired, and especially in the case of heavier lubricants, positive pressure feed may be provided. Lubricant passes from chamber 40 through ducts 43 and fills groove 42.

In the operation of the crusher, gyratory motion is imparted by the eccentric 13 to the head or gyratory member 25, relative to the fixed member or collar 30 associated with the bottom shell 7. All contacting surfaces of the sealing elements are kept fully lubricated by the described system and the effectiveness of the seal between the relatively moving surfaces is enhanced by the oil film therebetween. There is a tight sliding fit between ring 35 and flange 29 and between ring 33 and collar 30, and a tight sliding fit is maintained between the several rings by the spring 36. Vertical adjustment of the shaft is in no way interfered with, flange 29 sliding easily to any new adjusted relation to ring 35.

In Figure 3 the lower ring 33a is fixed to the collar 30 as by welding and the upper ring 31a has an internal flange through which it is secured to the top of the collar by bolts as at 50. The intermediate ring is formed in coaxial upper and lower spaced apart sections 35a and 35b provided with opposed channels in which is disposed a split sinuous spring 36a which urges the ring sections apart and the spherical surfaces thereof into contact with the mating surfaces of the fixed top and bottom rings, the contacting surfaces being, of course, spherical on a center which is at the neutral point of the gyratory shaft, not shown. The spring also maintains the ring sections 35a and 35b in register with their outer cylindrical surfaces in contact with the inner cylindrical surface of the head flange 29. The inner surfaces of the said ring sections are spaced outwardly of collar 30 so that an annular chamber 40a is provided to which lubricant can be supplied in the same manner as in Figures 1 and 2. The space 43a between the ring sections constitutes a duct through which lubricant is supplied to the contacting surfaces of the ring sections and flange 29. The duct as here indicated is peripherally continuous and so combines the function of the peripheral groove 42 of Figure 2. It will be evident that the mode of operation is substantially the same as in Figures 1 and 2, the main difference being in the manner of securing a continuing spring-urged contact between the spherical surfaces of the several rings so that wear is taken up and loss of lubricant is prevented.

While I have illustrated the invention in a single preferred embodiment, it will be understood that variations in the form and arrangement of parts are contemplated and are possible without departure from the invention as defined in the following claims.

I claim:

1. A seal for use in a gyratory crusher of the type comprising an upright gyratory shaft, a hub surrounding the lower end of the shaft, a crushing head on said shaft above said hub and having a depending annular flange, and a collar extending upwardly from said hub freely within said flange, said seal comprising means defining an external, outwardly facing, peripheral channel on said collar, a sealing ring movably engaged in said channel with its inner surface spaced from the inner surface of the channel and its outer surface contacting the inner surface of said flange, a lubricant supply conduit to the chamber defined by said channel and ring, the side walls of the channel being constituted by rings of which one is fixed to the collar and the other is slidable on the collar, and spring means for urging the slidable ring toward the fixed ring.

2. A seal for use in a gyratory crusher of the type comprising an upright gyratory shaft, a hub surrounding the lower end of the shaft, a crushing head on said shaft above said hub and having a depending annular flange, and a collar extending upwardly from said hub freely within said flange, said seal comprising means defining an external peripheral channel on said collar, a sealing ring movably engaged in said channel with its inner surface spaced from the inner surface of the channel and its outer surface contacting the inner surface of said flange, a lubricant supply conduit to the chamber defined by said channel and ring, a duct leading from the inner to the outer face of said sealing ring, the side walls of said channel being constituted by rings of which one is fixed to the collar and the other is slidable on the collar, and spring means for urging the slidable ring toward the fixed ring.

3. A seal for use in a gyratory crusher of the type comprising an upright gyratory shaft, a hub surrounding the lower end of the shaft, an eccentric journaled in said hub and receiving said lower end whereby upon rotation of the eccentric the shaft is caused to gyrate about a neutral point adjacent its upper end, a crushing head on said shaft above said hub and having a depending annular flange, and a collar extending upwardly from said hub freely within said flange, said seal comprising means defining an external peripheral channel on said collar, the opposed surfaces of said channel being spherical about said neutral point as a center, a ring movably engaged in said channel and having spherical side faces complementary to said opposed channel surfaces, the inner surface of said ring being spaced from the inner face of the channel and its outer face contacting the inner surface of said flange, a lubricant supply conduit to the chamber defined by said channel and ring, the side walls of the channel being constituted by rings of which one is fixed to the collar and the other is slidable on the collar, and spring means for urging the slidable ring toward the fixed ring.

4. A seal for use in a gyratory crusher of the type comprising an upright gyratory shaft, a hub surrounding the lower end of the shaft, an eccentric journaled in said hub and receiving said lower end whereby upon rotation of the eccentric the shaft is caused to gyrate about a neutral point adjacent its upper end, a crushing head on said shaft above said hub and having a depending annular flange, and a collar extending upwardly from said hub freely within said flange, said seal comprising means defining an external peripheral channel on said collar, the opposed surfaces of said channel being spherical about said neutral point as a center, a sealing ring movably engaged in said channel and having spherical side faces complementary to said opposed channel surfaces, the inner surface of said sealing ring being spaced from the inner face of the channel and its outer face contacting the inner surface of said flange, a lubricant supply conduit to the chamber defined by said channel and sealing ring, a duct leading from the inner to the outer face of said sealing ring, the side walls of the channel being constituted by rings of which one is fixed to the collar and the other is slidable on the collar, and spring means for urging the slidable ring toward the fixed ring.

5. Structure according to claim 4 wherein said conduit includes an axially extending passage in said collar and an opening in said collar from said passage to said chamber.

6. Structure according to claim 4 wherein said sealing ring is provided with a circumferential external groove into which said duct leads.

7. A seal for use in a gyratory crusher of the type comprising an upright gyratory shaft, a hub surrounding the lower end of the shaft, a crushing head on said shaft above said hub and having a depending annular flange, and a collar extending upwardly from said hub freely within said flange, said seal comprising means defining an external peripheral channel on said collar, a sealing ring movably engaged in said channel with its inner surface spaced from the inner surface of the channel and its outer surface contacting the inner surface of said flange, said ring comprising a pair of axially spaced apart portions, spring means between said portions urging them into contact with the channel side walls, and a lubricant supply conduit to the chamber defined by said channel and ring.

8. A seal for use in a gyratory crusher of the type comprising a gyratory member and a fixed member of which one surrounds the other in spaced relation thereto, said seal comprising a first ring fixed to one of said members and projecting toward the other but terminating short thereof, a second ring lapping the first in sliding contact therewith and with said other member but spaced from said first member, a third ring lapping the second ring in sliding contact therewith and with said one of said members and projecting toward said other member but terminating short thereof, spring means urging said rings together, a lubricant chamber being defined by said rings and said first member, and lubricant supplying means in communication with said chamber.

9. A seal for use in a gyratory crusher of the type comprising a gyratory member and a fixed member of which one surrounds the other in spaced relation thereto, said seal comprising a first ring fixed to one of said members and projecting toward the other but terminating short thereof, a second ring lapping the first in sliding contact therewith and in sliding contact with said other member but spaced from said first member, a third ring lapping the second ring in sliding contact therewith and in sealed contact with said one of said members and projecting toward said other member but terminating short thereof, spring means urging the lapping surfaces of said three rings into sealing contact, a lubricant chamber being defined by said rings and said first member, and lubricant supplying means in communication with said chamber.

SAMUEL W. TRAYLOR, Jr.

REFERENCES CITED

The following references are of record in the file of this patent:

UNITED STATES PATENTS

| Number | Name | Date |
|---|---|---|
| 970,231 | Niedermeyer et al. | May 31, 1910 |
| 1,576,376 | Sudekum | Mar. 9, 1926 |
| 1,770,609 | Frauenheim | July 15, 1930 |
| 1,846,598 | Hodgkinson | Feb. 23, 1932 |
| 1,875,266 | Santiago | Aug. 20, 1932 |
| 1,911,736 | Wilkening | May 30, 1933 |
| 2,022,135 | Newhouse | Nov. 26, 1935 |
| 2,023,338 | Morgan | Dec. 3, 1935 |
| 2,134,885 | Newhouse et al. | Nov. 1, 1938 |
| 2,260,612 | Fall | Oct. 28, 1941 |

FOREIGN PATENTS

| Number | Country | Date |
|---|---|---|
| 203,177 | Great Britain | 1923 |